United States Patent [19]

Johnson et al.

[11] Patent Number: 4,799,383

[45] Date of Patent: Jan. 24, 1989

[54] VISUAL INDICATOR

[75] Inventors: Thomas C. Johnson; Lenard W. Johnson, both of Roseau, Minn.

[73] Assignee: LTJ Enterprises, Inc., Roseau, Minn.

[21] Appl. No.: 33,064

[22] Filed: Mar. 31, 1987

Related U.S. Application Data

[63] Continuation-in-part of Ser. No. 910,231, Sep. 19, 1986, abandoned.

[51] Int. Cl.$^4$ .................... G01F 23/00; G01F 23/16
[52] U.S. Cl. ......................... 73/290 R; 116/276; 116/227; 116/270
[58] Field of Search .............. 73/290 R, 296, 323; 116/109, 227, DIG. 7, 270

[56] References Cited

U.S. PATENT DOCUMENTS

| 910,606 | 1/1909 | Swanson | 73/290 R |
|---|---|---|---|
| 1,298,950 | 4/1919 | Hull . | |
| 1,945,203 | 1/1934 | Schiske . | |
| 2,640,977 | 6/1953 | Parisi . | |
| 2,696,738 | 12/1954 | Lupfer . | |
| 2,764,645 | 9/1956 | Smith | 73/290 R |
| 2,888,898 | 6/1959 | Patterson | 73/323 |
| 3,011,470 | 12/1961 | Stoermer | 210/90 |
| 3,019,310 | 1/1962 | Hoff . | |
| 3,241,514 | 3/1966 | Grimland | 116/270 |
| 3,251,148 | 5/1966 | Knapp . | |
| 3,290,938 | 12/1966 | Miller | 73/290 R |
| 3,401,562 | 9/1968 | Reaney | 73/290 R |
| 3,443,437 | 5/1969 | Skalka . | |
| 3,492,968 | 2/1970 | Workman | 116/270 |
| 3,550,447 | 12/1970 | Beresic . | |
| 3,703,879 | 11/1972 | Huthsing | 116/270 |
| 3,777,697 | 12/1973 | Woessner . | |
| 3,992,296 | 11/1976 | Nobuta | 210/90 |
| 3,994,169 | 11/1976 | Wolford | 73/290 R |
| 4,031,847 | 6/1977 | Sullivan | 116/270 |
| 4,043,199 | 8/1977 | Greer | 73/290 R |
| 4,157,036 | 6/1979 | Kivenson | 73/290 R |
| 4,343,184 | 8/1982 | Jaulmes | 73/323 |
| 4,366,708 | 1/1983 | Warihashi | 116/270 |
| 4,376,490 | 3/1983 | Mizusaki | 116/227 |
| 4,421,124 | 12/1983 | Marshall | 128/782 |
| 4,499,846 | 2/1985 | Bergeron et al. | 116/272 |
| 4,557,216 | 12/1985 | Demyon | 116/227 |
| 4,614,477 | 9/1986 | Hagenbuch | 73/296 |

FOREIGN PATENT DOCUMENTS

| 0068971 | 6/1982 | European Pat. Off. . | |
|---|---|---|---|
| 684114 | 11/1939 | Fed. Rep. of Germany | 73/290 R |
| 2258611 | 6/1973 | Fed. Rep. of Germany | 73/290 R |
| 2909609 | 9/1979 | Fed. Rep. of Germany | 116/227 |
| 2826409 | 12/1979 | Fed. Rep. of Germany | 73/290 R |
| 1008985 | 3/1952 | France | 73/290 R |
| 1421592 | 11/1965 | France | 73/290 R |
| 41490 | 9/1965 | German Democratic Rep. | 73/290 R |
| 0540335 | 3/1956 | Italy | 73/296 |
| 2149113A | 6/1985 | United Kingdom . | |

Primary Examiner—William A. Cuchlinski, Jr.
Assistant Examiner—Thomas B. Will
Attorney, Agent, or Firm—Merchant, Gould, Smith, Edell, Welter & Schmidt

[57] ABSTRACT

A gauge or indicator (20) for providing a positive on/off visual indication comprises a lens (22) and a transition mount (24) with a resilient diaphragm (32) secured therebetween to define a sealed chamber therein. The chamber is filled with an opaque liquid (34) and a contrasting plug (36) which is secured to the diaphragm (32) and movable therewith responsive to an actuator stem (38) between an "off" position obscured by the liquid and an "on" position wherein the plug is visible behind the lens (22) upon displacement of the liquid.

18 Claims, 1 Drawing Sheet

VISUAL INDICATOR

CROSS REFERENCE TO RELATED APPLICATION

This is a continuation-in-part of co-pending application Ser. No. 910,231, filed Sept. 19, 1986, abandoned.

TECHNICAL FIELD

The present invention relates generally to an indicator device. More particularly, this invention concerns an indicator of simplified, inexpensive construction which is particularly adapted for use as a gauge mounted in the wall of a grain bin for providing a positive visual indication of the level of grain therein.

BACKGROUND ART

Storage tanks or holding bins are typically utilized to store corn or other types of grain. Such bins are usually about twenty feet high and can store between about 1,000 and 50,000 bushels or more of grain.

Keeping track of the amount of grain in such bins, however, has been a long-standing problem, to which there have been various approaches. One approach has been to track the number of truck loads of grain put in versus the number of truck loads removed from the bin. This of course requires use of trucks of the same size for loading and unloading, or if not, some computation to take into account different truck sizes. Another approach has been simply to climb a ladder on the side of the bin and knock on the wall, or look into the opening on the top of bin and count the number of exposed marking rings inside the bin. However, climbing ladders is tiring and time consuming, and can be dangerous—particularly at night and/or under adverse conditions when the ladder rungs are slippery from rain, dew, frost, sleet and the like. Yet another approach has been to put windows in the walls of the bins, however, these can quickly become dirty and the grain color therein usually does not provide enough contrast for easy viewing.

It will be appreciated that these prior approaches provide only rough approximations of material in the bin. A more accurate measurement of the grain in the holding bin is desirable, especially when using a grain dryer, which must be full to operate efficiently on a batch basis.

Level indicators for granulate storage tanks have been devised heretofore. For example, U.S. Pat. Nos. 3,290,938, 3,401,562 and 4,043,199 are representative of the prior art in this regard. These devices, however, have tended to be complicated and thus expensive.

A need has thus arisen for an improved visual indicator or gauge of simplified construction which will provide a positive, remote on/off visual indication of some condition, such as the level of grain in the bin without climbing any ladders.

SUMMARY OF INVENTION

The present invention comprises an improved visual indication which overcomes the foregoing and other difficulties associated with the prior art. In accordance with the invention, there is provided a visual indicator or gauge which is particularly adapted for use as a bin level gauge mounted in the wall of a grain bin or the like for providing a positive visual indication of the level of material therein. Moreover, although the present invention is particularly suited for use as a bin level gauge, it will be appreciated that it can be used in other applications wherein a positive on/off visual indication is desired. The gauge herein includes a substantially transparent or translucent lens and a transition mount. The lens is closed at its rear side by a resilient diaphragm to define a sealed chamber which is filled with an opaque liquid. Also located within the chamber is a filler bulb which is secured to the end of a slidable actuator stem that extends rearwardly from the indicator. The filler bulb is preferably of contrasting color and is normally obscured by the liquid in the lens. When the stem is actuated, the filler bulb displaces the opaque liquid so that it becomes visible through the lens, thereby providing a positive on/off indication.

BRIEF DESCRIPTION OF THE DRAWINGS

A better understanding of the invention can be had by reference to the following Detailed Description in conjunction with the accompanying Drawings, wherein.

DETAILED DESCRIPTION

Figure 1:
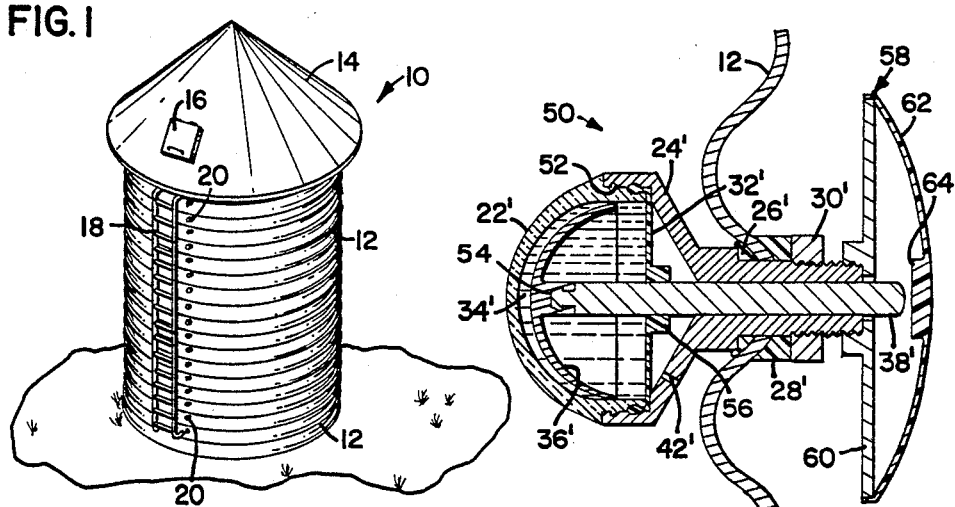
FIG. 1 is a perspective view of a grain storage bin incorporating several visual indicators of the invention.

Referring now to the drawings, wherein like reference numerals designate like or corresponding elements throughout the views, and particularly referring to FIG. 1, there is shown a holding tank or storage bin 10 of the type utilized for storing wheat and other types of grain. The storage bin 10 includes a side wall 12, which can be smooth or corrugated as shown, and a roof 14 including a door 16 for loading grain or material into the bin by means of an elevator or auger from a truck (not shown). An outside ladder 18 is provided on the bin side wall 12. A series of indicators 20 incorporating the invention are also provided at vertically spaced apart, calibrated intervals in the side wall 12 of bin 10. As will be more fully explained hereinafter, each indicator 20 provides a positive on/off visual indication about the presence of material at that location, thereby providing an accurate indication of the amount of grain in the bin by setting its level between two adjacent indicators, one of which is on and the other of which is off.

Although the indicator 20 of the present invention is particularly adapted for use as a bin level gauge in storage bins 10, of the stationary or mobile type, it will be understood that the invention can also be utilized in other applications wherein a positive on/off visual indication is desired.

Figure 2:
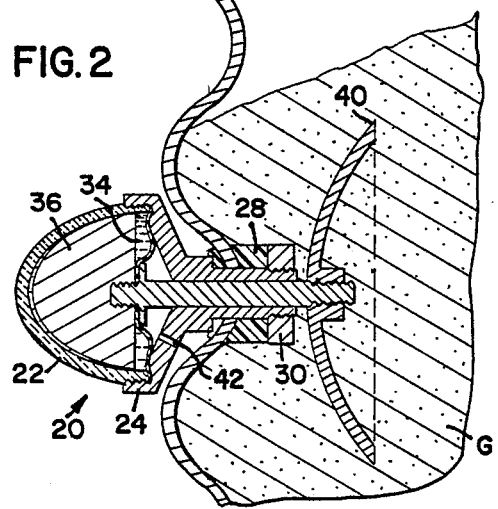
FIG. 2 is an enlarged vertical sectional view of a first embodiment of the visual indicators herein, shown in "off" and "on" positions.

FIG. 2 shows a pair of indicators 20 of the first embodiment mounted in the bin side wall 12. The upper indicator 20 is shown in the off position, while the lower indicator 20 is shown in the on position, responsive to pressure of the grain G. The indicator 20 includes a clear, transparent or translucent lens 22 which is threaded to a transition mount 24 extending through the bin side wall 12. The mount 24 is secured in place by means of a gasket 26 located between the outside of the bin side wall 12 and a shoulder on the mount, and a contoured pressure plate support or washer 28 and locking nut 30 on the inside of the bin side wall.

A resilient bladder or diaphragm 32 is secured between the lens 22 and mount 24 to define an internal chamber which is filled with a suitable opaque liquid 34 and a bulb or plug 36. The liquid 34 is preferably substantially opaque in order to obscure or block visibility of the plug 36 through lens 22. The plug 36 is preferably of high visibility, contrasting color. The resilient diaphragm 32 is clamped between the plug 36 and a slidable actuator stem 38 extending through a bore in the mount 24.

It will thus be appreciated that the contrasting plug 36 is normally supported by the diaphragm 32 in a retracted "off" position away from lens 22 with the opaque liquid 34 obscuring visibility of the plug. If desired, an additional compression spring can be provided for within fluid chamber 34 between plug 36 and lens 22 to provide additional pressure urging plug to the "off" position. However, the position of plug 36 is responsive to actuation of the stem 38, which can be actuated by various means. As shown, an actuator 40 is secured to the outer end of stem 38. It will be understood that the actuator 40 can be used in various styles. In the first embodiment, the actuator 40 takes the form of a cupshaped pressure plate which forces the stem 38 outwardly, responsive to pressure of the grain G, as shown in the lower portion of FIG. 2, wherein the opaque liquid 34 is displaced so that the contrasting plug 36 becomes visible in order to provide an "on" indication through lens 22.

If desired, a vent 42 can be provided in the transition mount 24 behind the diaphragm 32 for pressure equalization and drainage of any accumulated moisture therein.

Figure 3:
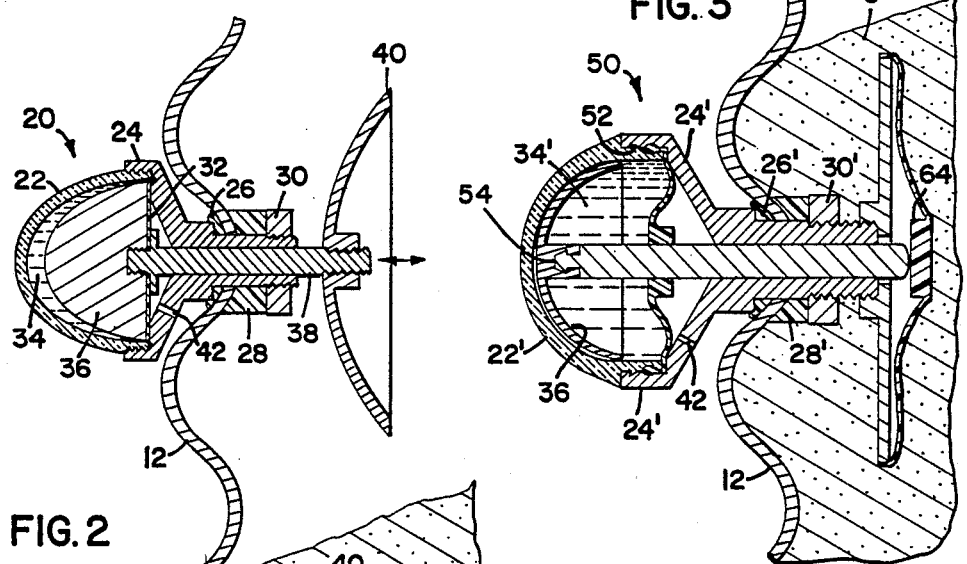
FIG. 3 is an enlarged vertical sectional view of a second embodiment of the visual indicators herein, shown in "off" and "on" positions.

FIG. 3 shows a visual indicator 50 in accordance with the second embodiment. The indicator 50 includes several components which are substantially similar to those in the first embodiment. Accordingly, the same reference numerals have been used to identify such components, but have been differentiated therefrom by means of prime (') notations.

The indicator 50 includes a lens 22' and transition mount 24', which are preferably secured together by means of a snap connection 52, instead of a threaded connection as in the first embodiment. The plug 36' is of hollow instead of solid configuration, and is secured to one end of the actuator stem 38' by means of a snap connection 54. The diaphragm 32' includes a raised boss 56 about its central opening by which it is adhesively secured or otherwise fixed to the stem 38'.

The indicator 50 also incorporates a sealed actuator 58 comprising a plate 60 which is threaded in fixed position to the end of the transition mount 24'. A resilient dome 62 with a raised boss 64 on the inside thereof, is secured over plate 60 and the protruding end of the actuator stem 38 in sealed relationship to protect against clogging and contamination. The resilient dome 62 collapses onto the actuator stem 38' responsive to pressure of liquid or granular material G as shown in the lower portion of FIG. 3.

Indicators 20 and 50 herein both include chambers oriented substantially horizontally, in line with the actuator stems. If desired, vertical chambers can be used with the filler plugs taking the form of floats normally urged to their off positions by buoyancy. The floating filler plugs could be cammed by the actuator stems to their on positions.

From the foregoing, it will thus be apparent that the present invention comprises an improved indicator having several advantages over the prior art. One significant advantage is that the blocking liquid is located completely outside of the container or bin so that no contamination of the material therein can occur. Instead of displacing contrasting liquid between a bladder and a bulb, as in the gauge shown in my prior application, the gauge herein utilizes the liquid between a block or expose visibility of a contrasting plug responsive to an actuator stem. The gauge herein has better sensitivity and visibility and more positive operation. Other advantages will be evident to those skilled in the art.

Although particular embodiments of the invention have been illustrated in the accompanying drawings and described in the foregoing Detailed Description, it will be understood that the invention is not limited only to the embodiments disclosed, but is intended to embrace any alternatives, equivalents, modifications and/or rearrangement of elements falling within the scope of the invention, as defined by the following claims.

What is claimed is:

1. A visual indicator, comprising:
   a transition mount:
   an arcuate lens secured to one end of said transition mount, said lens having outside and inside surfaces;
   a resilient, normally flat diaphragm secured between said lens and said transition mount to define a sealed chamber therein;
   a filler plug disposed within said chamber and secured to said diaphram, said plug being movable with said diaphragm toward and away from said lens and being normally supported by said diaphragm in a position away from said lens;
   said plug having an arcuate front side facing the opposite complementary inside surface of said lens, and a flat back side normally engaging said flat diaphragm over substantially the entire area of said diaphragm;
   a substantially opaque liquid disposed within the chamber between said lens and said plug in order to normally block visibility of said plug; and
   an actuator stem secured at one end to said diaphragm and plug and extending through a bore in said transition mount for actuating said plug toward said lens in order to displace said liquid and thereby visually expose the plug.

2. The indicator of claim 1, wherein said lens is substantially transparent, and wherein said filler plug and liquid are of contrasting colors.

3. The indicator of claim 1, and wherein said lens, transition mount and filler plug are formed from plastic.

4. The indicator according to claim 3, wherein said actuator stem is formed from plastic.

5. The indicator of claim 1, further including:
   a pressure plate secured to the other end of said actuator stem.

6. The indicator of claim 1, further including:
   a plate secured to the other end of said mount, the other end of said actuator stem extending through a central opening in said plate; and
   a resilient cover secured to said plate over the other end of said actuator stem.

7. A visual indicator, comprising:
   means including an arcuate lens and a resilient, normally flat diaphragm defining a sealed chamber;
   said lens having inside and outside surfaces;
   a filler plug disposed within said chamber and secured to said diaphragm, said plug being movable with said diaphragm toward and away from said lens and being normally supported by said diaphragm in a position away from said lens;

said plug having an arcuate front side facing the opposite complementary inside surface of said lens, and a flat back side normally engaging said flat diaphragm over substantially the entire area of said diaphragm;

a substantially opaque liquid disposed within the chamber between said lens and said plug in order to normally block visibility of said plug;

an actuator stem secured at one end to said diaphragm; and means for actuating the other end of said stem to urge said plug toward said lens in order to displace said liquid and therby visually expose the plug.

8. The indicator of claim 7, wherein said lens is substantially transparent.

9. The indicator of claim 7, and wherein said lens and filler plug are formed from plastic.

10. The indicator according to claim 9, wherein said actuator stem is formed from plastic.

11. The indicator according to claim 10, wherein said filler plug and liquid are of contrasting color.

12. The indicator of claim 7, further including:
a pressure plate secured to the other end of said actuator stem.

13. The indicator of claim 7, wherein said diaphragm is secured between said lens and one end of a transition mount which includes a vent passage therein opposite the sealed chamber.

14. The indicator according to claim 13, further including:
   a plate secured to the other end of said mount, the other end of said actuator stem extending through a central opening in said plate; and
   a resilient cover secured to said plate over the other end of said actuator stem.

15. A visual indicator, comprising:
means including an arcuate lens and a resilient diaphragm defining a sealed chamber;
said lens having inside and outside surfaces;
an actuator stem secured to said diaphragm and extending therethrough;
a filler plug disposed within said chamber;
a snap-connection interconnecting one end of said actuator stem and the inside surface of said filler plug, said plug being movable with the diaphragm and said actuator stem toward and away from said lens and being normally supported in a position away from said lens;
said filler plug having an arcuate front side facing the opposite complementary inside surface of said lens;
a substantially opaque liquid disposed within the chamber between said lens and said filler plug in order to normally block visibility of said plug; and
means for actuating the other end of said stem to urge said plug toward said lens in order to displace said liquid and thereby visually expose the plug.

16. The indicator of claim 15, further including:
a pressure plate secured to the other end of said actuator stem.

17. The indicator of claim 15, wherein said diaphragm is secured between said lens and one end of a transition mount which includes vent passage therein opposite the sealed chamber.

18. The indicator according to claim 17, further including:
a plate secured to the other end of said mount, the other end of said actuator stem extending through a central opening in said plate; and
a resilient cover secured to said plate over the other end of said actuator stem.

* * * * *